(12) United States Patent
Zhu et al.

(10) Patent No.: US 11,629,277 B2
(45) Date of Patent: Apr. 18, 2023

(54) MOISTURE CURABLE POLYURETHANE ADHESIVE COMPOSITION

(71) Applicant: Henkel AG & Co. KGaA, Duesseldorf (DE)

(72) Inventors: Hongye Zhu, Shanghai (CN); Dan Xie, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/178,361

(22) Filed: Feb. 18, 2021

(65) Prior Publication Data

US 2021/0171812 A1 Jun. 10, 2021

Related U.S. Application Data

(63) Continuation of application No. PCT/CN2018/101863, filed on Aug. 23, 2018.

(51) Int. Cl.
| | | |
|---|---|---|
| *C08G 18/42* | (2006.01) | |
| *C09J 175/08* | (2006.01) | |
| *B32B 5/02* | (2006.01) | |
| *B32B 7/12* | (2006.01) | |
| *B32B 27/32* | (2006.01) | |
| *B32B 27/36* | (2006.01) | |
| *B32B 27/40* | (2006.01) | |
| *B32B 37/12* | (2006.01) | |
| *C08G 18/12* | (2006.01) | |
| *C08G 18/40* | (2006.01) | |
| *C08G 18/76* | (2006.01) | |
| *C09J 175/06* | (2006.01) | |
| *C08G 18/48* | (2006.01) | |

(52) U.S. Cl.
CPC ............ *C09J 175/08* (2013.01); *B32B 5/022* (2013.01); *B32B 5/024* (2013.01); *B32B 5/026* (2013.01); *B32B 7/12* (2013.01); *B32B 27/322* (2013.01); *B32B 27/36* (2013.01); *B32B 27/40* (2013.01); *B32B 37/1207* (2013.01); *C08G 18/12* (2013.01); *C08G 18/4018* (2013.01); *C08G 18/7671* (2013.01); *C09J 175/06* (2013.01); *B32B 2274/00* (2013.01); *B32B 2307/724* (2013.01); *B32B 2437/00* (2013.01); *B32B 2437/02* (2013.01); *C08G 18/4202* (2013.01); *C08G 18/4216* (2013.01); *C08G 18/4238* (2013.01); *C08G 18/4833* (2013.01)

(58) Field of Classification Search
CPC .................................................. C08G 18/4202
See application file for complete search history.

(56) References Cited

U.S. PATENT DOCUMENTS

| | | | | |
|---|---|---|---|---|
| 4,281,077 A | * | 7/1981 | Hirzy | C08G 18/4202 525/169 |
| 5,599,895 A | * | 2/1997 | Heider | C08G 18/4018 528/80 |
| 5,869,593 A | * | 2/1999 | Helmeke | B32B 27/40 528/80 |
| 6,093,270 A | | 7/2000 | Ferencz et al. | |
| 7,344,619 B2 | | 3/2008 | Helmeke | |
| 7,914,896 B2 | | 3/2011 | Kanagawa et al. | |
| 8,349,123 B2 | | 1/2013 | Zhang et al. | |
| 9,410,013 B2 | | 8/2016 | Leimenstoll et al. | |
| 9,464,155 B2 | | 10/2016 | Kanagawa et al. | |
| 10,190,029 B2 | | 1/2019 | Franken et al. | |
| 10,221,346 B2 | | 3/2019 | Suen | |
| 2006/0084755 A1 | | 4/2006 | Good et al. | |
| 2007/0232764 A1 | | 10/2007 | Minamida et al. | |
| 2009/0159206 A1 | | 6/2009 | Wang | |
| 2010/0249291 A1 | | 9/2010 | Ichihashi et al. | |
| 2016/0333236 A1 | | 11/2016 | Suen | |
| 2017/0002239 A1 | | 1/2017 | Janke et al. | |
| 2017/0058162 A1 | | 3/2017 | Slark et al. | |
| 2017/0058163 A1 | | 3/2017 | Slark et al. | |
| 2017/0183550 A1 | | 6/2017 | Sun et al. | |
| 2017/0190852 A1 | | 7/2017 | Ferencz et al. | |
| 2019/0127618 A1 | | 5/2019 | Kuramochi et al. | |
| 2020/0407610 A1 | | 12/2020 | Kinoshita et al. | |

FOREIGN PATENT DOCUMENTS

| | | |
|---|---|---|
| CN | 1185170 A | 6/1998 |
| CN | 1775887 A | 5/2006 |
| CN | 102037040 A | 4/2011 |
| CN | 105899614 A | 8/2016 |
| CN | 106459723 A | 2/2017 |
| CN | 106536666 A | 3/2017 |
| CN | 107090268 A | 8/2017 |
| CN | 107109177 A | 8/2017 |
| CN | 108251039 A | 7/2018 |
| EP | 3031839 A1 | 6/2016 |
| EP | 3315527 A1 | 5/2018 |
| WO | 2009123905 A1 | 10/2009 |
| WO | 2016026775 A1 | 2/2016 |
| WO | 2017009310 A1 | 1/2017 |
| WO | 2018108592 A1 | 6/2018 |

OTHER PUBLICATIONS

Google Translation of CN 108251039 (Year: 2022).*
International Search Report for International PCT Patent Application No. PCT/CN2018/101863 dated May 29, 2019.
S. Mondal, J.L. Hu, Z. Yong; Journal of Membrane Science (2006) 280, pp. 427-432.

* cited by examiner

*Primary Examiner* — Michael M Dollinger
(74) *Attorney, Agent, or Firm* — James E. Piotrowski

(57) ABSTRACT

This invention relates to moisture curable polyurethane adhesive compositions and more particularly to moisture curable polyurethane adhesive compositions having improved initial tack and moisture permeability when cured. In one embodiment the disclosed moisture curable polyurethane adhesive compositions are suited for use as hot melt adhesives for use in manufacturing textile, clothing and/or footwear articles.

18 Claims, No Drawings

MOISTURE CURABLE POLYURETHANE ADHESIVE COMPOSITION

TECHNICAL FIELD

The present invention relates generally to moisture curable polyurethane adhesive compositions and more particularly to moisture curable polyurethane adhesive compositions for use in textile industry having improved initial tack and moisture permeability when cured.

BACKGROUND OF THE INVENTION

Moisture curable polyurethanes, especially hydrophilic polyurethanes are composed of soft segments which are water soluble or highly water swellable. The best examples of such oligomers as soft segments are poly(ethylene oxide)s of molecular weight above 1000. Oligomers composed of random or block ethylene oxide and propylene oxide units can also be considered as hydrophilic depending on the level of ethylene oxide in their chemical compositions. Hard segments in hydrophilic polyurethanes are made of conventional diisocyanates and organic diols or diamines and they are usually not water soluble. Important applications of hydrophilic polyurethanes include biomaterials, protective wound dressings and water resistant but moisture permeable textile coatings and films as well as adhesives.

For such polyurethane adhesives used in bonding the water resistant but moisture permeable textile coating or films to form laminates, they are required to have excellent initiate tack as well as satisfactory moisture permeability. However, common moisture curable and hydrophilic polyurethane adhesives show either low initial tack which is inconvenient for coating process, or low moisture permeability which does not fulfill the industrial requirement.

Therefore, there is still a need to develop an improved moisture curable polyurethane adhesive composition which can overcome the abovementioned concerns and is suitable for bonding water resistant but moisture permeable textile laminates.

SUMMARY OF THE INVENTION

The present invention directs to moisture curable polyurethane adhesive compositions which overcome the abovementioned disadvantages. The moisture curable polyurethane adhesive compositions in this invention have excellent initial tack when cured. The adhesive compositions in this invention exhibit excellent moisture permeability when cured. Besides, the application of the moisture curable polyurethane adhesive composition is simple and suitable for industrial production process for textile.

The present invention, in general, provides a moisture curable polyurethane adhesive composition, comprising a urethane prepolymer which is obtained by reacting
polyols comprising
(a1) an amorphous polyester polyol,
(a2) a semi-crystalline polyester polyol, and
(a3) a polyether polyol, and
a polyisocyanate.

Also disclosed is a laminate comprising a first moisture permeable substrate and a second moisture permeable substrate of the same type or different type with respect to the first moisture permeable substrate, wherein the second moisture permeable substrate is adhered on one side or on both sides of the first moisture permeable substrate on which the moisture curable polyurethane adhesive composition according to the present invention is applied in a heated molten.

Also disclosed is a moisture permeable adhesive film, formed from a moisture curable polyurethane adhesive composition according to the present invention.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

On one aspect, the present invention concerns a moisture curable polyurethane adhesive composition, comprising an isocyanate-functional polyurethane prepolymer which is obtained by reacting a) polyols comprising (a1) an amorphous polyester polyol, (a2) a semi-crystalline polyester polyol, and (a3) a polyether polyol, and b) a polyisocyanate. Surprisingly, the inventors have found that the moisture curable polyurethane adhesive composition has high initial tack and excellent moisture permeability with the incorporation of semi-crystalline polyester polyol as one of the major components of polyols.

The amorphous polyester polyols that can be used in accordance with the embodiments described herein have a number average molecular weight Mn in the range of 400 g/mol to 5000 g/mol, preferably 500 to 3000 g/mol, more preferably 800 to 2500 g/mol, most preferably 1000 to 3000 g/mol. "Amorphous", as used herein in relation to the polyols, means that the polyol has a crystallinity of less than 10%, preferably less than 5%, more preferably less than 2%, as determined by differential scanning calorimetry (DSC) according to ISO 11357. The amorphous (polyester) polyols furthermore have a glass transition temperature Tg in the range of −120° C. to 40° C., preferably −70° C. to 30° C., again as determined by differential scanning calorimetry (DSC) according to ISO 11357.

The amorphous polyester polyols have functions of improving washing resistance, prolonging open time and providing good final bonding strength to the adhesive composition when cured.

The amorphous polyester polyol is preferably a polyester polyol produced by polycondensation of an aromatic polycarboxylic acid, an aliphatic polyol and optionally an aliphatic polycarboxylic acid as major components.

The aromatic polycarboxylic acid is preferably an aromatic polycarboxylic acid having from 8 to 20 carbon atoms, and specific examples thereof include phthalic acid, isophthalic acid, terephthalic acid, trimellitic acid, pyromellitic acid, biphenyldicarboxylic acid and the like. The aromatic polycarboxylic acid may be used in the form of a derivative, such as a polyalkylester thereof, a polyarylester thereof and an acid anhydride thereof. Preferred examples thereof include phthalic acid, isophthalic acid and terephthalic acid, and a dialkylester compound thereof, a diarylester compound thereof, and phthalic anhydride.

The alkyl group of the polyalkylester is preferably an aliphatic saturated hydrocarbon group having from 1 to 8 carbon atoms, and particularly from 1 to 5 carbon atoms, and specific examples thereof include a methyl group, an ethyl group, a propyl group, a butyl group and the like. The aryl group of the polyarylester is preferably an aromatic hydrocarbon group having from 6 to 12 carbon atoms, and specific examples thereof include a phenyl group, a tolyl group, a chlorophenyl group and the like.

The aliphatic polyol is preferably an aliphatic diol having from 2 to 12 carbon atoms, and particularly from 2 to 8 carbon atoms, and specific examples thereof are ethylene glycol, 1,3-propanediol, 1,4-butanediol, 1,5-pentanediol, neopentyl glycol, 1,6-hexanediol, 1,10-decanediol, 1,12-dodecanediol, 2,2-diethylpropanediol, 2-ethyl-2-butylpropanedial, cyclohexanedimethanol and the like. Among these, preferred examples thereof include ethylene glycol, 1,4-butanediol, neopentyl glycol and 1,6-hexanediol.

The optional aliphatic polycarboxylic acid is preferably a carboxylic acid having from 4 to 12 carbon atoms, and particularly from 4 to 8 carbon atoms, and specific examples thereof include adipic acid, azelaic acid, sebacic acid, decanedioic acid, dodecanedioic acid and the like. Among these, adipic acid is particularly preferred.

More specifically, preferred are amorphous polyester polyols having a combination of phthalic acid and neopentyl glycol as major components and a combination of adipic acid, isophthalic acid, terephthalic acid, ethylene glycol and neopentyl glycol as major components.

Such amorphous polyester polyols are commercially available under the trade name Dynacoll 7100 series from Evonik. An example of a useful amorphous polyester polyol is Dynacoll 7130, an amorphous copolyester polyol having a Tg of about 30° C. Another example is amorphous polyester polyols are commercially available under the trade name 5507-1000 from Eternal Materials. When employed, the amorphous polyester polyol will typically represent from 5 to 35, preferably from 10 to 25, by weight percent of the moisture curable polyurethane adhesive composition of this invention.

The semi-crystalline polyester polyol may have a number average molecular weight Mn in the range of 400 g/mol to 5000 g/mol, preferably 500 to 3000 g/mol, more preferably 800 to 2500 g/mol, most preferably 1000 to 2000 g/mol. "Semi-crystalline", as used herein in relation to the (polyester) polyols, means that they have a crystallinity of at least 50%, preferably at least 70%, but less than 90%. Semi-crystalline (polyester) polyols thus comprise crystalline and non-crystalline, i.e. amorphous, regions. Amorphous polymers, as compared with semi-crystalline polymers, show only a glass stage in the DSC measurement according to ISO 11357 during the transition from the brittle, rigid state to the softened state. A melt peak indicating a semi-crystallinity of the polymer does not occur in the DSC measurements. The semi-crystalline polyester polyol may also have a melting temperature Tm in the range of 40° C. to 80° C., preferably 40 to 60° C., again as determined by differential scanning calorimetry (DSC) according to ISO 11357.

The semi-crystalline polyester polyol is used from the standpoint of balancing the initial tack and moisture permeability of the moisture curable polyurethane adhesive composition, and is preferably a semi-crystalline polyester polyol produced by polycondensation of an aliphatic dicarboxylic acid and two or more aliphatic diols as major components. The semi-crystalline polyester polyols can provide proper initial tack, final bonding strength and partly improves moisture permeability to the adhesive composition when cured.

The aliphatic dicarboxylic acid is preferably a linear aliphatic dicarboxylic acid having from 6 to 12 carbon atoms, and specific examples thereof include adipic acid, azelaic acid, sebacic acid, decanedioic acid, dodecanedioic acid and the like. Among these, adipic acid is particularly preferred.

The two or more aliphatic diols each are preferably a linear aliphatic diol having from 2 to 12 carbon atoms, preferably 2 to 6 carbon atoms, and more preferably 2 to 4 carbon atoms. Specific examples of the aliphatic diols include ethylene glycol, 1,3-propanediol, 1,4-butanediol, 1,5-pentanediol, neopentyl glycol, 1,6-hexanediol, 1,10-decanediol, 1,12-dodecanediol, 2,2-diethylpropanediol, 2-ethyl-2-butylpropanedial, cyclohexanedimethanol and the like. Among these, preferred examples thereof include ethylene glycol, 1,3-propanediol, 1,4-butanediol, 1,5-pentanediol, neopentyl glycol, 1,6-hexanediol, 1,10-decanediol and 1,12-dodecanediol, and more preferred examples thereof include ethylene glycol, 1,4-butanediol, 1,10-decanediol, 1,12-dodecanediol and 1,6-hexanediol. Preferably, the aliphatic diols comprise ethylene glycol.

Such semi-crystalline polyester polyols are commercially available under the trade name AR-U2720 from Yong Shun Chemical and under the trade name XCP-355, from Xuchuan Chemical. When employed, the semi-crystalline polyester polyol will typically represent from 5 to 35, preferably from 8 to 30, by weight percent of the moisture curable polyurethane adhesive composition of this invention.

According to the present invention, polyether polyols to form polyurethane prepolymer mainly contribute to offering hydrophilicity with the cured adhesive composition and improve the moisture permeability. Suitable polyether polyols include linear and/or branched polyethers having plural numbers of ether bonds and at least two hydroxyl groups, and contain substantially no functional group other than the hydroxyl groups. Examples of the polyether polyol may include polyoxyalkylene polyol such as polyethylene glycol, polypropylene glycol, polytetramethylene glycol, polybutylene glycol or mixture thereof. Further, a homopolymer and a copolymer of the polyoxyalkylene polyols or mixtures thereof may also be employed. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1,3-glycerin, 1,2,6-hexane triol, trimethylol propane, trimethylol ethane, tris(hydroxyphenyl)propane, triethanolamine, triisopropanolamine; with at least one compound selected from the group consisting of ethylene oxide, propylene oxide and butylene oxide. While such compounds are commercially available, methods for synthesizing such compounds are well known in the art.

The polyether polyol may have a number average molecular weight Mn in the range of 400 g/mol to 5000 g/mol, preferably 500 to 3000 g/mol, more preferably 800 to 2500 g/mol, most preferably 1000 to 3000 g/mol. Non-limiting examples of commercially available polyether polyols which may be used in the practice of the invention include polyoxyethylene glycol available under the trade name PEG-1000 and PEG-2000 from Sanyo Chemical. When employed, the polyether polyol will typically represent from 20 to 70, preferably from 30 to 60, by weight percent of the moisture curable polyurethane adhesive composition of this invention.

In addition to the above-mentioned polyols, the moisture curable polyurethane adhesive composition comprises less than 5%, preferably less than 1%, and more preferably no crystalline polyols as the incorporation of the crystalline polyol may deteriorate the moisture permeability of the polyurethane adhesive composition when cured. "Crystalline", as used herein in relation to the polyester polyols, relates to a crystallinity of at least 90%, preferably at least 95%, as determined by differential scanning calorimetry (DSC) according to ISO 11357.

As suitable polyisocyanates to be used as monomer in the preparation of the polyurethane prepolymer, preferably isocyanates which contain two or three NCO-groups are selected. They include well-known aliphatic, cyclo-aliphatic or aromatic monomeric diisocyanates. Preferably polyisocyanates are selected from such with a molecular weight from 160 g/mol to 500 g/mol, for example aromatic polyisocyanates as 4,4'-diphenylmethanediisocyanate (MDI), 2,2'-diphenylmethane diisocyanate, diphenyl methane 2,4'-diisocyanate, 1,3-phenylenediisocyanate, 1,4-phenylenediisocyanate, naphthalene-1,5-diisocyanate (NDI), toluenediisocyanate (TDI), tetramethyl xylylene diisocyanate, toluene diisocyanate, naphthalene, di- and tetraalkyl diphenylmethane diisocyanate, 4,4'-dibenzyl diisocyanate, and combinations thereof.

Aliphatic isocyanates such as dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6 diisocyanate (HDI), tetramethoxybutane 1,4-diisocyanate, dicyclohexylmethanediisocyanate, 1,12-diisocyanato-dodecane, cyclic diisocyanates such as 4,4-dicyclohexylmethanediisocyanate, 1,3-cyclohexane or 1,4-cyclohaxene diisocyanate, 1-methyl-2,4-diisocyanato-cyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MD (partly hydrogenated)), xylylenediisocyanate (XDI), tetramethyl-xylylenediisocyanate (TMXDI), di- and tetraalkylenediphenylmethane-diisocyanate can also be used.

Preferred diisocyanates with two NCO groups of different reactivity are selected from the group of the aromatic, aliphatic or cyclo-aliphatic diisocyanates. It is also possible to include at least partly oligomeric diisocyanates such as allophanate, carbodiimide, biuret condensation products from diisocyanates, e.g., from HDI, MDI, IPDI or other isocyanates. Mixtures of aliphatic or aromatic isocyanates can be used. More preferably aromatic diisocyanates are used.

The moisture curable polyurethane adhesive composition contains in preferred embodiments the polyisocyanate from 5 to 40% by weight, based on the total weight of the adhesive composition. In more preferred embodiments the polyisocyanate is contained from 10 to 30% by weight and in most preferred embodiments from 10 to 25% by weight.

The polyisocyanate is reacted in excess with a polyol with regard to the molar ratio of the NCO groups of the polyisocyanate to the OH groups of the polyols (molar NCO:OH ratio) to produce an isocyanate-functional polyurethane prepolymer. By selection of the molar NCO:OH ratio it is possible to control the molecular weight and the amount of reactive NCO groups in the prepolymer. In one embodiment, the molar ratio of NCO groups in the polyisocyanates to OH groups in the polyols is larger than 1, preferably larger than 2, more preferably from 2.2 to 3.2.

According to the present invention, the moisture curable polyurethane adhesive composition may optionally comprise additives such as a tackifier, a curing catalyst, a stabilizer, a filler, a dye, a pigment, a fluorescent brightening agent, a silane coupling agent, a wax, thermoplastic resins and the like, in addition to the polyurethane prepolymer, if the purpose of the invention is not impaired.

According to the present invention, the moisture curable polyurethane adhesive composition may comprise a tackifier. Examples are rosin-based resins, rosin ester-based resins, hydrogenated rosin ester-based resins, terpene-based resins, terpene phenol-based resins, hydrogenated terpene-based resins, or C5 aliphatic resins, C9 aromatic resins and C5 and C9 copolymer resins as petroleum resins, and the like.

According to the present invention, the moisture curable polyurethane adhesive composition may comprise a stabilizer. Examples are hindered phenol-based compounds, benzotriazole-based compounds, hindered amine-based compounds and the like.

According to the present invention, the moisture curable polyurethane adhesive composition may comprise a filler. Examples are silicic acid derivatives, talc, powdered metals, calcium carbonate, clay, carbon black, fumed silica and the like.

The moisture curable polyurethane adhesive composition can be prepared by the following process. All polyols were added to be melt and mixed under vacuum until homogeneous and free of moisture at 80 to 130° C. for 0.5 to 5 hours. Then the polyisocyanate was added to the mixture at 50 to 100° C. and polymerization was allowed to proceed with mixing under vacuum at 80 to 120° C. until the reaction was completed after 1 to 3 hours. The completion of the reaction can be monitored by means of suitable measuring devices fitted in the reaction vessel and/or by analysis of removed samples. Suitable methods are known to the person skilled in the art. They are for example, viscosity measurements, measurements of the NCO content, of the OH content, gas chromatography, nuclear magnetic resonance spectroscopy, (near-)infrared spectroscopy. The NCO content of the mixture is preferably determined by titrimetry.

The moisture curable polyurethane adhesive composition can be suitably used as a moisture curable polyurethane adhesive composition for various moisture permeable substrates, and for example, can be used in the production of a laminate in which a first moisture permeable substrate and a second moisture permeable substrate are bonded. The first and second first moisture permeable substrates can be in same type or different types.

As for the method for producing the laminate, specifically, there is a method of continuously applying or intermittently applying the moisture curable polyurethane adhesive composition in a heated molten state on a first moisture permeable substrate, placing a second moisture permeable substrate on the adhesive-applied surface, and pressing and curing the laminate for several hours to several days. The application of the adhesive may be performed on the first or second substrate, or may also be performed on the substrate surfaces of both substrates.

The moisture curable polyurethane adhesive composition can also be used in the production of, for example, a laminate in which on both sides of a first moisture permeable substrate, a second moisture permeable is adhered. This laminate can be produced by continuously applying or intermittently applying the moisture curable polyurethane adhesive composition in a heated molten state on one surface of a first moisture permeable substrate, placing a second moisture permeable substrate on the adhesive-applied surface, pressing the laminate, subsequently applying the adhesive on the other surface of the first moisture permeable substrate by the same method as described above, placing second moisture permeable substrate thereon, and pressing and curing the assembly for several hours to several days by a conventionally known method.

Examples of the first moisture permeable substrate are moisture permeable films obtained by using resins such as solvent-based or aqueous polyurethane resins, thermoplastic polyurethane resins (TPU), thermoplastic polyester resins (TPE), and porous polytetrafluoroethylene (PTFE), or fibrous substrates such as non-woven fabrics, woven fabrics and knitted fabrics.

As for the second moisture permeable substrate, such substrates can be used in accordance with the uses of the laminate obtained. In particular, in the case of using the laminate in sportswear or the like, it is preferable to use a fibrous substrate as the first moisture permeable substrate, and a moisture permeable adhesive film formed from a porous polytetrafluoroethylene or polyurethane resin, or the moisture permeable adhesive film of the invention that will be described later, as the second moisture permeable substrate.

The moisture curable polyurethane adhesive composition can be applied on the first moisture permeable substrate or the second moisture permeable substrate by, for example, a gravure transfer coating method using a carved roll, a screen coating method, a T-die coating method, a fiber coating method or the like.

The heating and melting temperature of the moisture curable polyurethane adhesive composition in that case is preferably 70 to 130° C., and more preferably 80 to 120° C.

The laminates obtained by the above-described methods can be used in the manufacturing of, for example, sportswear, raincoats, shoes, firefighter uniform, military uniform and the like.

The moisture permeable adhesive film of the present invention is a product obtained by processing a moisture curable polyurethane hot melt composition containing a polyurethane prepolymer into a film form or a sheet form, the polyurethane prepolymer being obtained by reacting polyols comprising an amorphous polyester polyol, a semi-crystalline polyester polyol, and a polyether polyol, with a polyisocyanate.

The moisture permeable adhesive film may vary in the thickness depending on the uses or the like, but preferably has a film thickness in the range of approximately 5 to 50 µm. In the case where moisture permeability of a further higher level is required, the film thickness is more preferably in the range of 5 to 20 µm.

The moisture permeable adhesive film can be produced by, for example, processing the moisture curable polyurethane hot melt composition into a film form by a die coating method, a roll coating method or the like.

The moisture permeable adhesive film of the invention can be used in, for example, the moisture permeable films which are present in the middle between the outer garment and the inner garment, which constitute the moisture permeable, waterproof clothing for sportswear, raincoats, shoes, firefighter uniform, military uniform and the like, or in air filters.

The moisture permeable adhesive film of the invention is preferably used as the first moisture permeable substrate and the second moisture permeable substrate used in the production of the aforementioned laminate. For example, a laminate can be produced by intermittently applying the moisture curable polyurethane adhesive composition in a heated molten state on a first moisture permeable substrate such as a fibrous substrate, and placing and adhering the moisture permeable adhesive film of the invention on the adhesive-applied surface.

The laminate obtained by this method can be used in, for example, sportswear, raincoats, shoes, firefighter uniform, military uniform, and the like.

The moisture curable polyurethane adhesive composition of the present invention preferably has a melt viscosity at 100° C. in the range of 500 to 9000 mPa-s, preferably 1000 to 7000 mPa-s, measured according to EN ISO 2555 by Brookfield Digital Viscometer RVT using spindle 27 at 10 rpm.

The moisture curable polyurethane adhesive composition when cured exhibits an initial tack of no less than 0.7 N/inch, preferably no less than 0.8 N/inch, measured according to ASTM D2724-1987 by coating 0.05 mm thickness of adhesive composition between two PET film layers, and after 5 minutes measuring the loading strength by a tensile machine.

The moisture curable polyurethane adhesive composition when cured exhibits a Moisture Vapor Transmission Rate (MVTR) of no less than 4500 g/(m$^2$-day), preferably no less than 5000 g/(m$^2$-day), measured on a MOCON Permatran-W 3/33 water vapor permeability instruments according to JIS L1099 2006. The thickness of the films used in this testing was ranged from 15 to 20 µm. Flat film samples were clamped into the diffusion cell, which was then purged of residual water vapor using moisture free carrier gas. This moisture free carrier gas was routed to the sensor until a stable MVTR has been established. Molecules of water diffusing through the film to the inside chamber were conveyed to the sensor by the carrier gas.

The following examples are intended to assist one skilled in the art to better understand and practice the present invention. The scope of the invention is not limited by the examples but is defined in the appended claims. All parts and percentages are based on weight unless otherwise stated.

EXAMPLES

The following materials were used in the examples. PEG-1000 is the trade name of polyoxyethylene glycol having a molecule weight of about 1000 available from Sanyo Chemical. PEG-2000 is the trade name of polyoxyethylene glycol having a molecule weight of about 2000 available from Sanyo Chemical. AR-U2720 is the trade name of semi-crystalline polyester polyol produced by polycondensation of adipate acid, ethylene glycol, and butylene glycol and having a molecule weight of about 2000, available from Yong Shun Chemical. XCP-355 is the trade name of semi-crystalline polyester polyol produced by polycondensation of adipate acid, ethylene glycol, and butylene glycol and having a molecule weight of about 1000, available from Xuchuan Chemical. Dynacoll 7130 is the trade name of amorphous polyester polyol produced by polycondensation of adipic acid, isophthalic acid, terephthalic acid, and diols having 2, 5 and 10 carbon atoms, and having a molecule weight of about 3000 and a Tg of about 30° C., available from Evonik. 5507-1000 is the trade name of amorphous polyester polyol produced by polycondensation of phthalic acid and neopentyl glycol and having a molecule weight of about 1000 available from Eternal Materials. CTP-1024 is the trade name of a crystalline polyester polyol produced by polycondensation of adipate acid and ethylene glycol and having a molecule weight of about 1000 available from Xuchuan Chemical. Dynacoll 7360 is the trade name of a crystalline polyester polyol produced by polycondensation of adipate acid and hexanediol and having a molecule weight of about 3000 available from Evonik. Pearlbond 893 is the trade name of a thermoplastic resin available from Lubrizol. Wannate 100 is the trade name of an MDI available from Wanhua Group.

The moisture curable polyurethane adhesive compositions were prepared as Examples (Ex.) and Comparative Examples (CEx.). All polyols were added to be melt and mixed under vacuum until homogeneous and free of moisture at 110° C. for 2 hours. Then MDI was added to the mixture at 80° C. and polymerization was allowed to proceed with mixing under vacuum at 100° C. until the reaction was completed after 2 hours.

Performance Evaluation

Melt Viscosity

The melt viscosity was measured at 80° C. or 100° C. according to EN ISO 2555 by Brookfield Digital Viscometer RVT using spindle 27 at 10 rpm.

Initial Tack

The initial tack was measured according to ASTM D2724-1987 by coating 0.05 mm thickness of adhesive composition between two PET film layers, and after 5 minutes measuring the loading strength by a tensile machine.

Moisture Vapor Transmission Rate

The MVTR was measured on a MOCON Permatran-W 3/33 water vapor permeability instruments according to JIS L 1099-2006. The thickness of the films used in this testing was ranged from 15 to 20 μm. Flat film samples were clamped into the diffusion cell, which was then purged of residual water vapor using moisture free carrier gas. This moisture free carrier gas was routed to the sensor until a stable MVTR has been established. Molecules of water diffusing through the film to the inside chamber were conveyed to the sensor by the carrier gas.

The test results were also shown in Table 1. It is evident that all inventive examples exhibited high initial tack and good moisture permeability, whereas the comparative examples could not achieve an excellent balance of initial tack and moisture permeability. In addition, the inventive examples possess a melt viscosity suitable for common hot melting process in textile manufacturing.

What is claimed is:

1. A moisture curable polyurethane adhesive composition, comprising an isocyanate-functional polyurethane prepolymer which is the reaction product of a mixture, including:
   a) polyols comprising
      (a1) an amorphous polyester polyol having a crystallinity of less than 10% determined by DSC according to ISO 11357,
      (a2) a semi-crystalline polyester polyol having crystalline and non-crystalline regions and a crystallinity of 20% to 90%, determined by DSC according to ISO 11357, and
      (a3) a polyether polyol having an Mn in the range of 400 g/mol to 2500 g/mol, and

TABLE 1

Formulations of the moisture curable polyurethane adhesive compositions (by weight percent)

| Component | Ex. 1 | Ex. 2 | Ex. 3 | Ex. 4 | CEx. 1 | CEx. 2 | CEx. 3 |
|---|---|---|---|---|---|---|---|
| PEG-1000 | | | | 35% | 43.91% | 55.02% | 51.91% |
| PEG-2000 | 44.89% | 45% | 40% | | | | |
| ARU 2720 | 10.27% | 17% | | 30% | | | |
| XCP-355 | | | 20% | | | 9.34% | |
| Dynacoll 7130 | | 20% | | | | | |
| 5507-1000 | 23.54% | | 15% | 12% | 22.35% | | |
| CTP-1024 | | | | | | | 8.81% |
| Dynacoll 7360 | | | | | 8.78% | 10% | 15% |
| Pearlbond 893 | | | 3.50% | | | | |
| Wannate 100 | 21.30% | 18% | 21.5% | 23% | 24.78% | 25.64% | 24.28% |
| Properties | | | | | | | |
| Molar NCO:OH ratio | 2.91 | 3.01 | 2.67 | 2.6 | 2.7 | 2.99 | 3.04 |
| Viscosity (mPa·s) | 5150 (@100° C.) | 3500 (@100° C.) | 4600 (@100° C.) | 3800 (@100° C.) | 5300 (@100° C.) | 4525 (@80° C.) | 6937 (@80° C.) |
| MVTR (g/(m²·day)) | 5185.5 | 5047.9 | 5103.2 | 5291.1 | 3627.4 | 4102.4 | 3890.6 |
| Initial tack (N/inch) | 0.92 | 0.82 | 1.05 | 0.94 | 0.64 | 0.45 | 0.52 | b) a polyisocyanate;
wherein the mixture contains less than 5% by weight of crystalline polyols based on the total weight of the moisture curable polyurethane adhesive composition.

2. The moisture curable polyurethane adhesive composition according to claim 1, wherein the amorphous polyester polyol is produced by polycondensation of an aromatic polycarboxylic acid, an aliphatic polyol and optionally an aliphatic polycarboxylic acid.

3. The moisture curable polyurethane adhesive composition according to claim 1, wherein the semi-crystalline polyester polyol produced by polycondensation of an aliphatic dicarboxylic acid and two or more aliphatic diols.

4. The moisture curable polyurethane adhesive composition according to claim 3, wherein one of the aliphatic diols comprises ethylene glycol.

5. The moisture curable polyurethane adhesive composition according to claim 1, wherein the polyether polyol is selected from polyethylene glycol, polypropylene glycol, polytetramethylene glycol, polybutylene glycol, and mixtures thereof.

6. The moisture curable polyurethane adhesive composition according to claim 1, wherein the molar ratio of NCO groups in the polyisocyanates to OH groups in the polyols is larger than 2.

7. The moisture curable polyurethane adhesive composition according to claim 1, wherein the moisture curable polyurethane adhesive composition of the present invention has a melt viscosity at 100° C. in the range of 500 to 9000 mPa·s, measured according to EN ISO 2555 by Brookfield Digital Viscometer RVT using spindle 27 at 10 rpm.

8. The moisture curable polyurethane adhesive composition according to claim 1, wherein the moisture curable polyurethane adhesive composition when cured exhibits an initial tack of no less than 0.7 N/inch, according to ASTM D2724-1987.

9. The moisture curable polyurethane adhesive composition according to claim 1, wherein the moisture curable polyurethane adhesive composition when cured exhibits a moisture vapor transmission rate of no less than 4500 g/($m^2$ day), according to JIS L1099-2006.

10. The moisture curable polyurethane adhesive composition according to claim 1 being a hot melt adhesive.

11. A moisture permeable adhesive film, formed from the moisture curable polyurethane adhesive composition of claim 1.

12. Cured reaction products of the moisture curable polyurethane adhesive composition according to claim 1.

13. An article comprising cured reaction products of the moisture curable polyurethane adhesive composition according to claim 1.

14. An article of clothing or footwear comprising cured reaction products of the moisture curable polyurethane adhesive composition according to claim 1.

15. A moisture curable, polyurethane hot melt adhesive composition, comprising an isocyanate-functional polyurethane prepolymer which is the reaction product of a mixture comprising:
(a1) 5% to 35% by weight of an amorphous polyester polyol having an Mn in the range of 400 g/mol to 5000 g/mol and a crystallinity of less than 10%,
(a2) 5% to 35% by weight of a semi-crystalline polyester polyol having crystalline and non-crystalline regions and an Mn in the range of 400 g/mol to 5000 g/mol and a crystallinity of at least 50 to less than 90%, and
(a3) 20% to 70% by weight of a polyether polyol having an Mn in the range of 400 g/mol to 2500 g/mol, and
b) 10% to 30% by weight of a polyisocyanate,
wherein the mixture contains less than 5% by weight of crystalline polyols and in which the weight percentages are based on the total weight of the moisture curable polyurethane adhesive composition.

16. The moisture curable polyurethane hot melt adhesive composition of claim 15 wherein the moisture curable polyurethane adhesive composition when cured exhibits an initial tack of no less than 0.7 N/inch and/or a Moisture Vapor Transmission Rate (MVTR) of no less than 4500 g/($m^2$·day).

17. The moisture curable polyurethane adhesive hot melt composition of claim 15 comprising less than 1% by weight of crystalline polyols.

18. A method of making a laminate, comprising providing a first moisture permeable substrate having a bonding surface;
providing a second moisture permeable substrate having a bonding surface;
providing the moisture curable, polyurethane hot melt adhesive composition of claim 1,
heating the moisture curable, polyurethane hot melt adhesive composition to a temperature in the range of 70 to 130° C. to place it in a molten form;
applying the heated moisture curable, polyurethane hot melt adhesive composition to the first substrate bonding surface;
disposing the second substrate bonding surface on the applied moisture curable, polyurethane hot melt adhesive composition;
cooling the applied moisture curable, polyurethane hot melt adhesive composition; and
exposing the applied moisture curable, polyurethane hot melt adhesive composition to moisture to cure the adhesive.

\* \* \* \* \*